Feb. 4, 1936. A. AMES, JR., ET AL Re. 19,841

CLINICAL OPTICAL MENSURATION METHOD AND INSTRUMENT

Original Filed Aug. 13, 1929 5 Sheets-Sheet 1

Inventors
Adelbert Ames Jr.
Gordon H. Gliddon
by Robert Cushman Woodworth
Attys.

CLINICAL OPTICAL MENSURATION METHOD AND INSTRUMENT

Original Filed Aug. 13, 1929 5 Sheets-Sheet 2

Inventors
Adelbert Ames Jr.
Gordon H. Gliddon
by Parris, Cushman & Wright
Attys.

Feb. 4, 1936. A. AMES, JR., ET AL Re. 19,841
CLINICAL OPTICAL MENSURATION METHOD AND INSTRUMENT
Original Filed Aug. 13, 1929 5 Sheets-Sheet 3
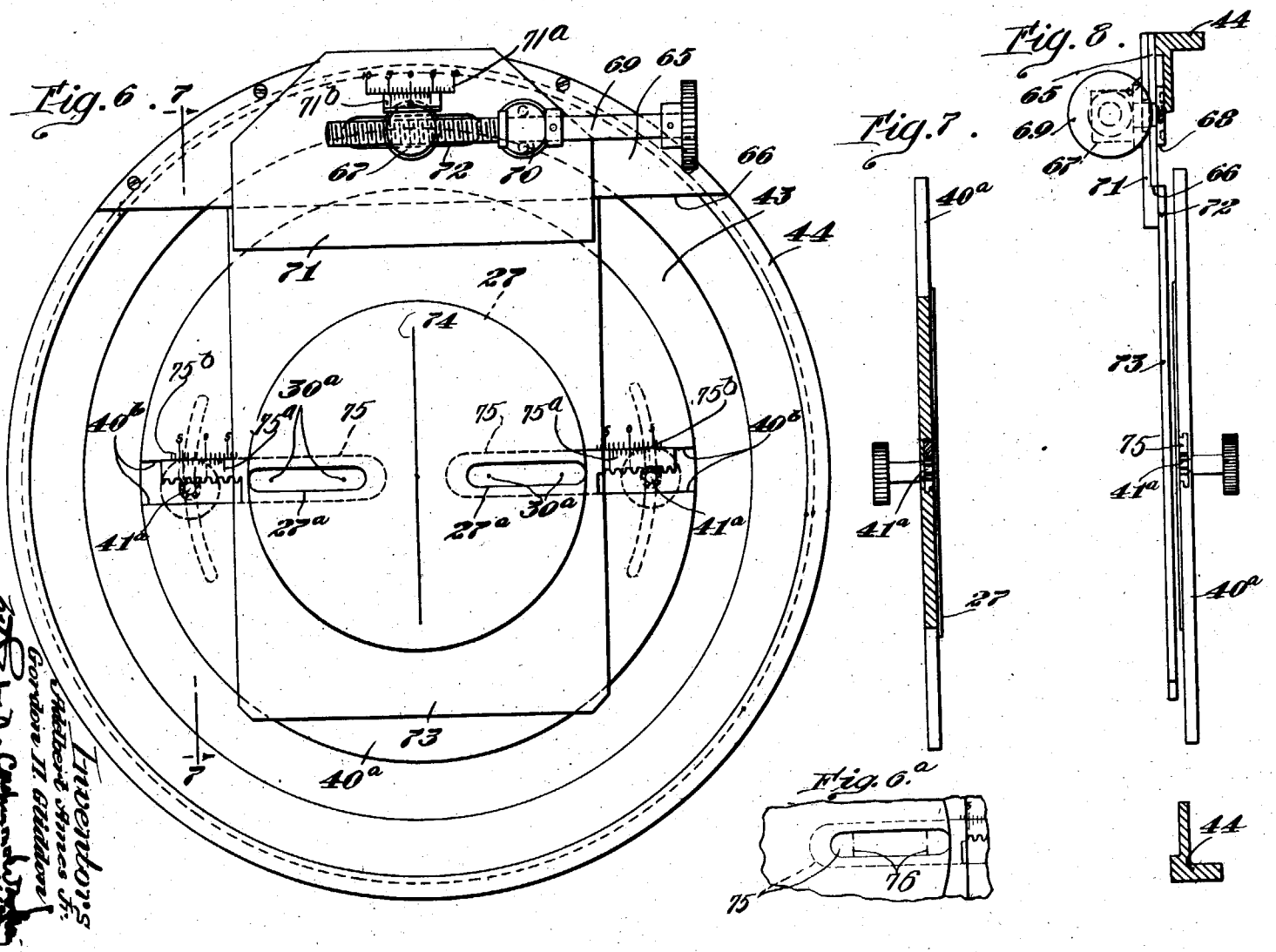

CLINICAL OPTICAL MENSURATION METHOD AND INSTRUMENT

Original Filed Aug. 13, 1929 5 Sheets-Sheet 4

Inventors
Adelbert Ames Jr.
Gordon H. Gliddon
by Pierce Cushman and Hopkins
Attys.

CLINICAL OPTICAL MENSURATION METHOD AND INSTRUMENT

Original Filed Aug. 13, 1929 5 Sheets-Sheet 5

Inventors
Adelbert Ames Jr.
Gordon H. Gliddon
By Fowler, Cushman & Woodberry
their Attorneys Reissued Feb. 4, 1936 Re. 19,841

UNITED STATES PATENT OFFICE 19,841

CLINICAL OPTICAL MENSURATION METHOD AND INSTRUMENT

Adelbert Ames, Jr., and Gordon H. Gliddon, Hanover, N. H., assignors to Trustees of Dartmouth College, Hanover, N. H., a corporation of New Hampshire Original No. 1,944,871, dated January 30, 1934, Serial No. 385,611, August 13, 1929. Application for reissue March 11, 1935, Serial No. 10,496

39 Claims. (Cl. 88—20)

This invention relates to a method and apparatus for the clinical determination of and mensuration of the physiological optical condition of the human eyes, for diagnosis and as an aid to the provision of corrective procedure or devices.

Objects of the invention are to provide a method of and improved devices for the accurate clinical determination and mensuration of errors of joint perception of visible objects by the eyes, or of each eye in respect to the other, or the normal expected perception; to provide a method and apparatus for the clinical determination and mensuration of horizontal vertical and cyclotorsional phorias and other conditions of stress or imbalance; to provide means for the clinical detection and measurement of an associated phenomenon hereinafter referred to as "retinal slip", and to provide means for the clinical investigation and measurement of certain asymmetries of perception ascribed to differing responses of the retinas to like objects. These defects, which may also be described as retinal image asymmetry or ocular image asymmetry, and means for alleviating them are explained more in detail in the copending application of Adelbert Ames, Jr. and Gordon H. Gliddon, Serial No. 385,610, filed August 13, 1929.

As herein used, the term "retina" comprises the brain elements corresponding to the retinal elements in the eyes proper and the nervous tracts interconnecting these elements. The image asymmetry due to a difference in the optical images formed by the dioptric apparatus of the eyes with or without the aid of dioptric correction means, or to the anatomical or physiological differences of the retinal structure bringing the dioptric images to consciousness, or to both, may also be referred to as difference of ocular images, that is to say the actual total visual impression of an eye however obtained.

The apparatus of this invention improves upon and supplements the apparatus for clinical optical mensuration described and claimed in the application for patent of Adelbert Ames, Jr., Serial No. 272,027, filed April 23, 1928, and it is understood that in addition to the new tests which can be made with the present device, all investigations for which the older instrument is suited can also be executed with the aid of the apparatus to be described herein. Investigation and determination of perception phenomena, including the above-mentioned different response of the retinas to comparable objects, that is the ocular image difference, involves the relation of ocular images in binocular vision, and their comparison by relative adjustment thereof, is preferably carried out in connection with apparatus capable of fixing conditions for simultaneous binocular vision of the patient's eyes, and may comprise comparison of the perceptive reaction to images of like objects binocularly fused and unlike objects not fused, with provision for control and mensuration of vergence angles, retinal slip and ocular accommodation at differing distances of the respective objects. In one aspect the invention provides targets or object-holders having devices for accurate measurement of relative distance of the objects in the field of view, of dimension in respect to each other and of position or orientation in a plane at right angles to the axis of vision.

The invention will now be described in connection with recommended specific forms only of apparatus representative of the genus of the invention and selected for illustration in the accompanying drawings, in which Fig. 1 is a view in elevation of a target;

Fig. 6 is a front elevation of the head portion of a modified form of target;

Figure 10:
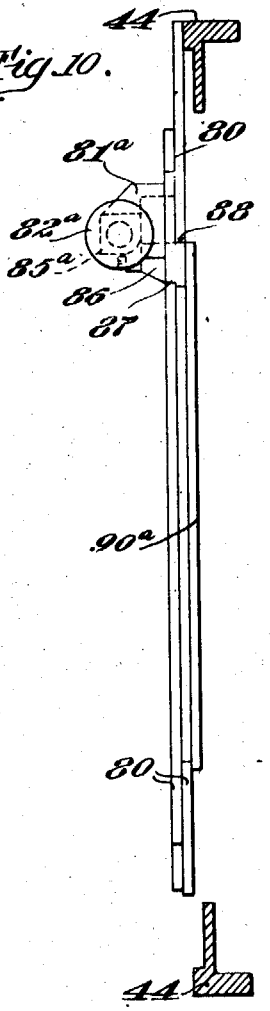
Figure 9:
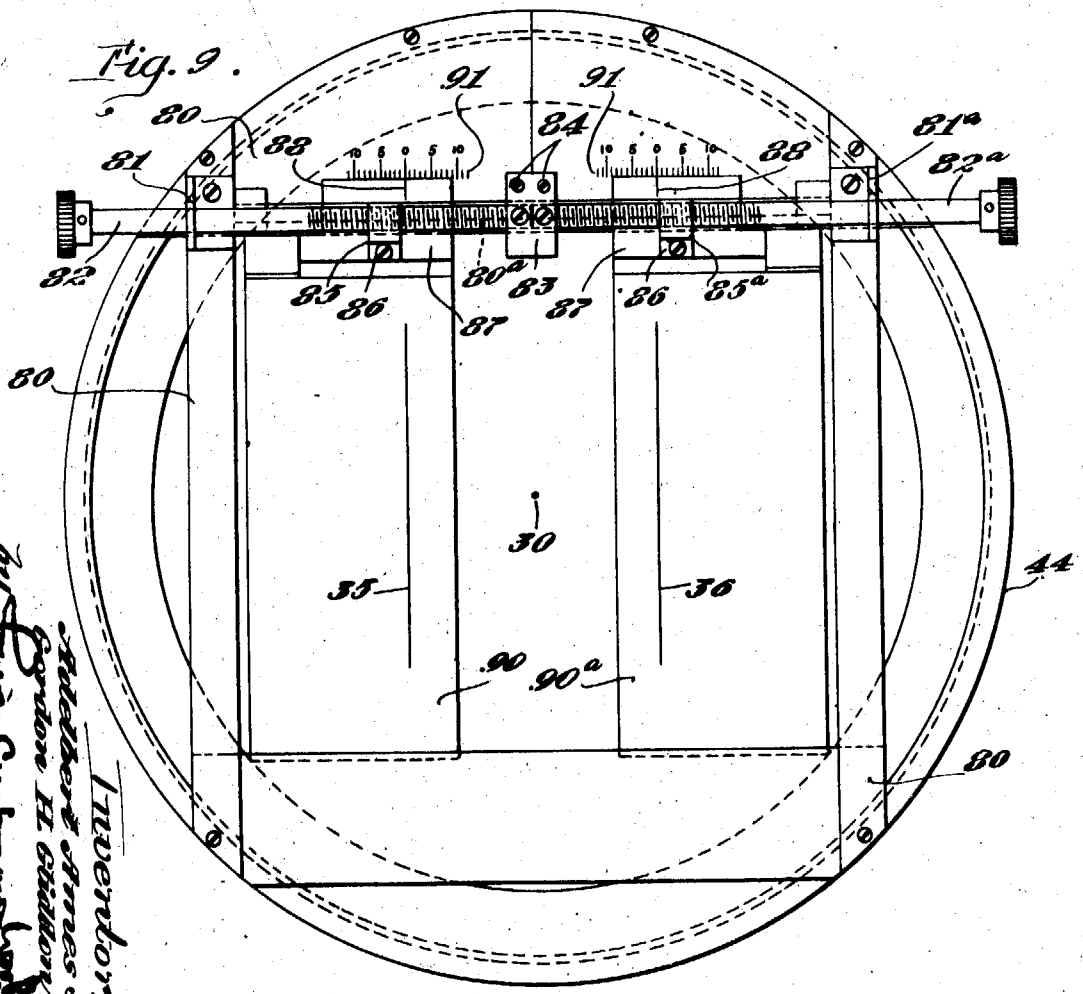

Fig. 6[a] is a detail elevation of a complementary part of another target made like Fig. 6;

Fig. 7 is a detail section on line 7—7 of Fig. 6;

Fig. 8 is a detail right side elevation partly in vertical longitudinal section of parts shown in Fig. 6;

Fig. 9 is a front elevation of another form of target corresponding to Fig. 6;

Fig. 10 is a vertical section partly in elevation of parts shown in Fig. 9; and

Figure 11:
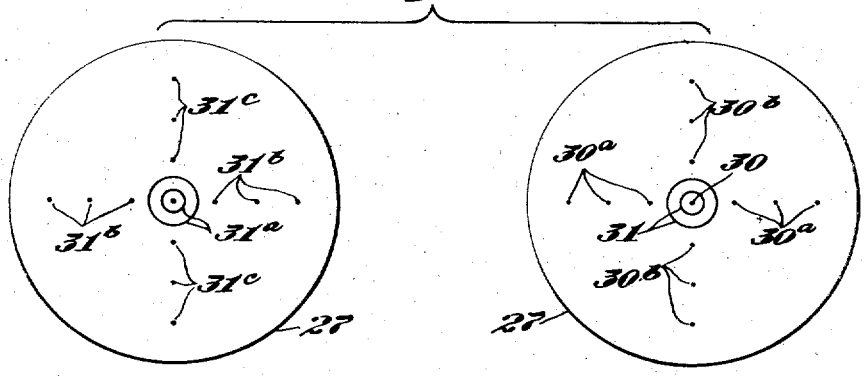
Figure 12:
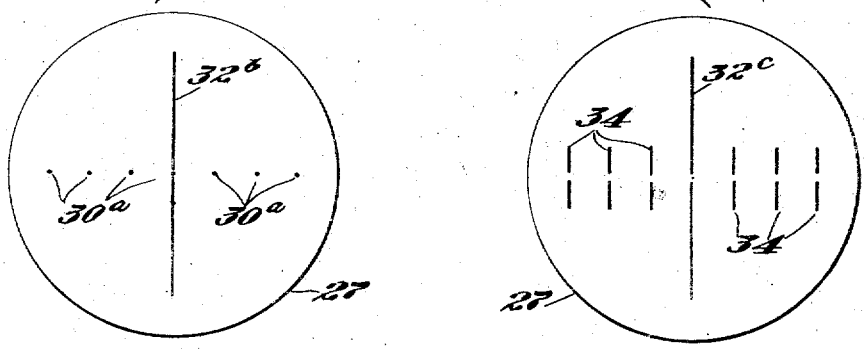
Figure 13:
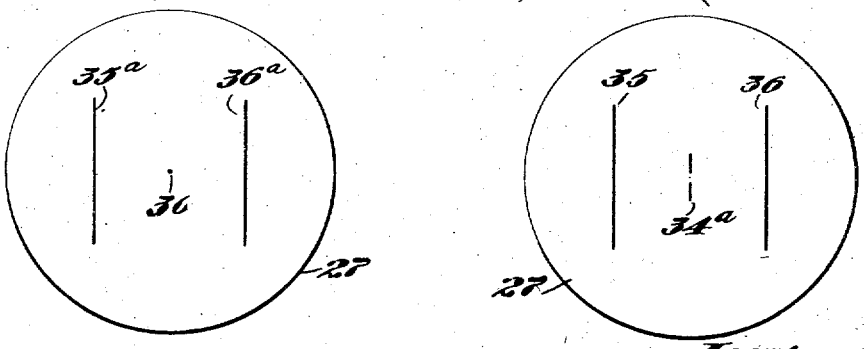

Figs. 11, 12 and 13 are, respectively, elevations each showing a face view of a complementary pair of replaceable or variable objects adapted to be used one in each of two of the targets.

Figure 2:
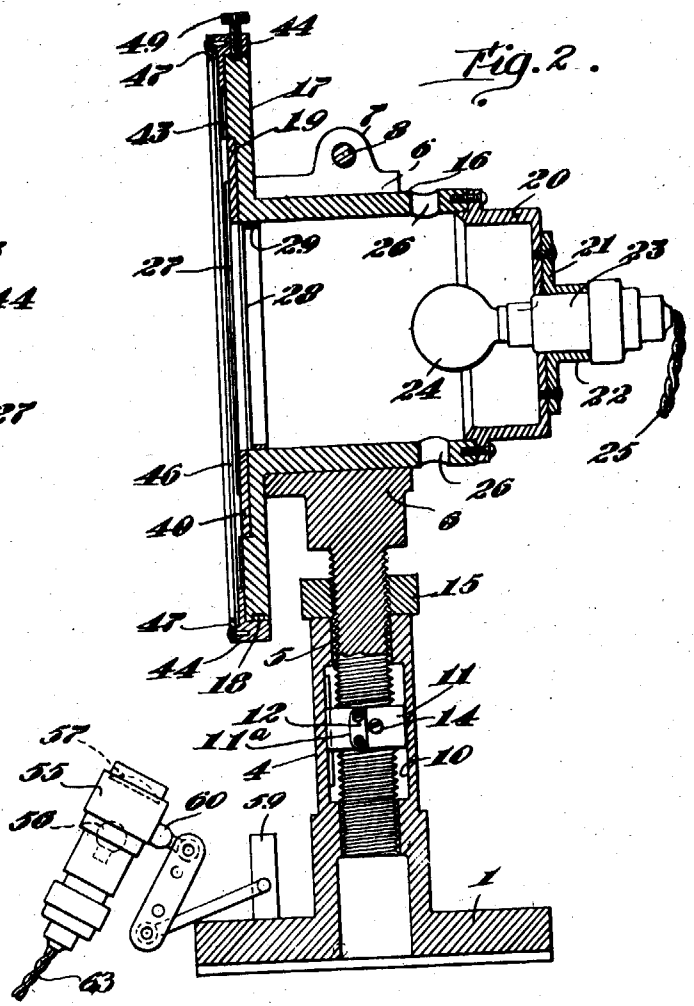
Fig. 2 is a vertical longitudinal section of the target shown in Fig. 1.
Figure 1:
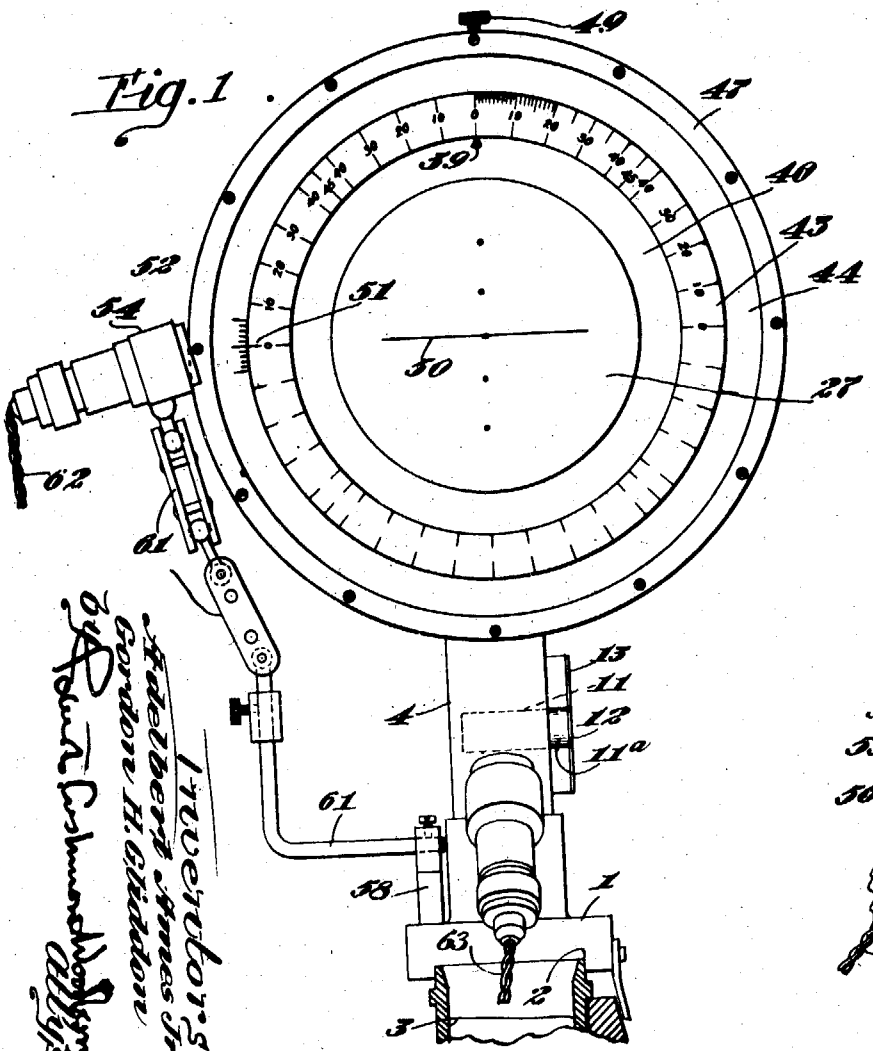
Figure 3:
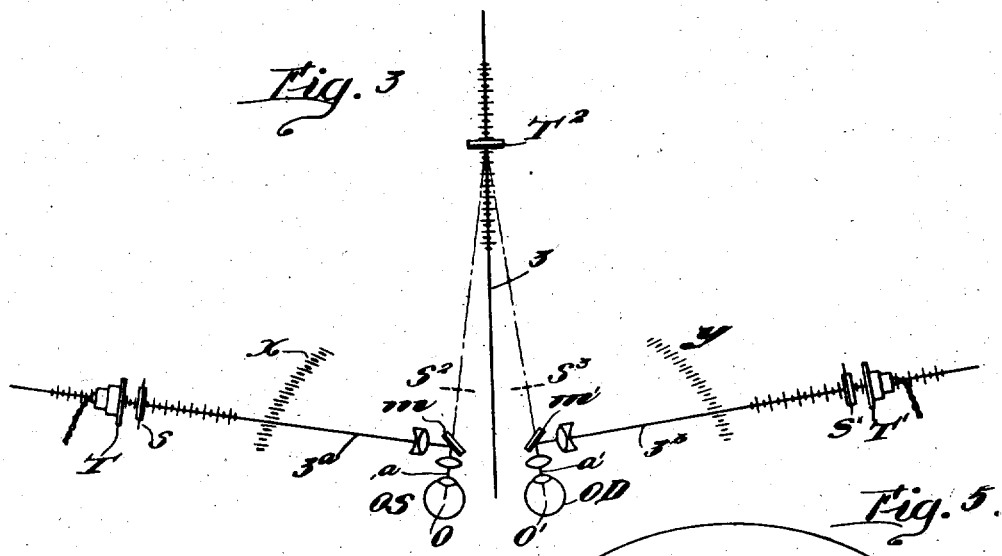
Fig. 3 is a diagram in plan of one kind of appurtenant apparatus with which the device of Figs. 1 and 2 may be used.

Referring now to Figs. 1 and 2, each member of a pair of targets may comprise a base 1 having a bottom grooved at 2 to fit over a straight slideway 3, 3[a] or 3[b], Figs. 1 and 3, and a tubular column 4 bored to receive a screw 5 integral with or attached to an enlarged split annular head 6 having lugs for a clamp screw 8.

Column 4 is milled out to a parallel sided aperture 10 adapted to receive the squared faces of a collar 11 having a lug 11a projecting through said aperture and carrying an index 12 for reading the height of screw 5 against a vertical scale 13 on column 4. Collar 11 may be fastened to screw 5 suitably, by a screw 14, for example. The vertical position of screw 5 and its attachments is controlled by a knurled hand nut 15 taking against the machined upper face of column 4.

Annular head 6 may be clamped on the cylindrical hollow barrel 16 of a target head having a preferably integral annular flange 17 peripherally grooved at 18 and concentrically recessed on one face at 19. Barrel 16 may be closed at one end by an extension 20 and head 21 having a concentric nipple 22 in which is mounted a socket 23 for a suitable incandescent lamp 24 lit by current leads 25; the interior of the lantern constituted by the barrel 16 and heads 20 and 21 may be enameled white or lined with a white substance or provided with any other suitable reflector. If it is desired to use a very bright and hot lamp at 24, not usually necessary, suitable holes may be provided at 26 for ventilation. A diffusion screen of thin ground glass or other diffusion material, or a collar screen 28 may be mounted in the front end of the bore of barrel 16, against a slip ring 29, but this is not necessary for the recommended types of light-emitting object discs 27, which may be of any desired kind of translucent or opaque thin sheet body capable of showing drawn, engraved, printed or enameled indications of contrasting color or color value by reflected or transmitted light on one face, and capable of having in it a small hole or holes such as 30, Fig. 11, of the order of 0.1 to 0.2 mm. in diameter for the transmission of the brighter light from inside the lantern constituted by barrel 16 for an artificial star. In a preferred form as shown in Figs. 11 to 13, these objects 27 may be discs made of translucent or opaque stiff paper or white pigmented sheet material such as coated metal, celluloid or a phenolaldehyde condensation product, or any other suitable sheet substance, some having artificial star holes 30 and the same or others having dark-line opaque visual objects 31 of any desired character, of which preferred forms will presently be explained. Any form of lantern capable of illuminating a bright point for an artificial star may be substituted for the barrel 16 and lamp 24.

Figure 5:
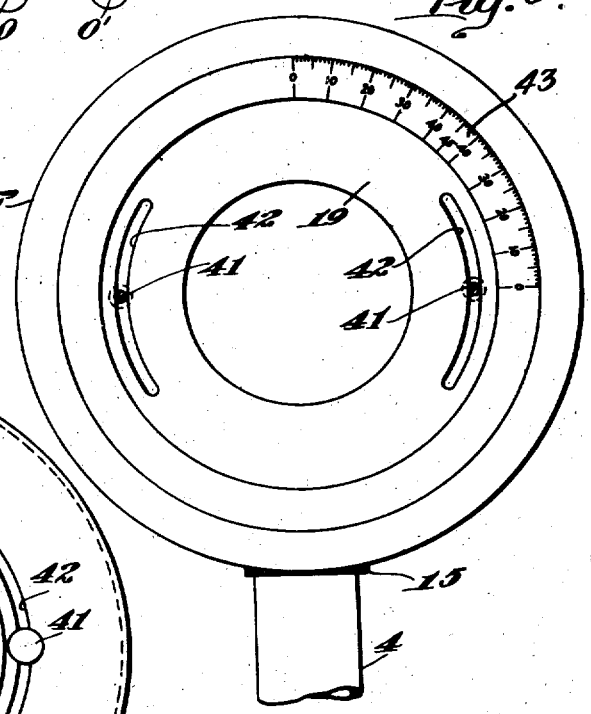
Fig. 5 is a front elevation of an element of one of the targets.
Figure 4:
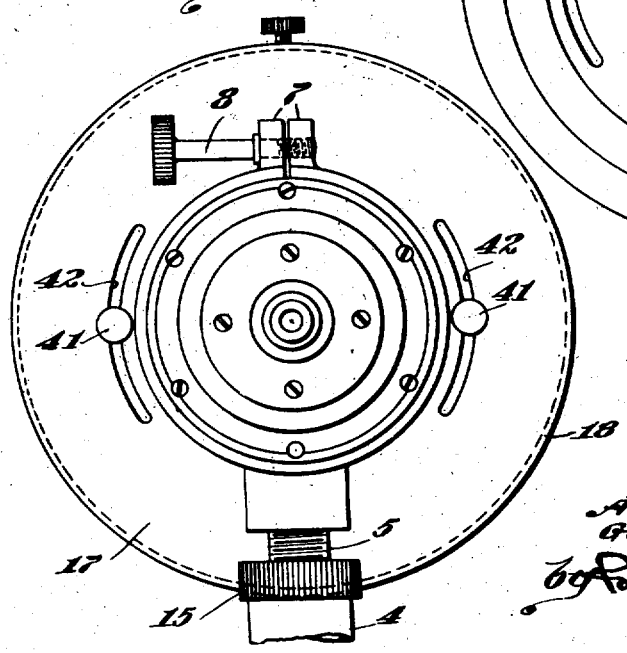
Fig. 4 is a rear elevation of a detail of the target shown in Figs. 1 and 2.

The target discs 27 are preferably mounted by cementing or otherwise on a rotatably adjustable holder, as shown a flat annulus 40 fitting for rotation in the recess 19, and movable by either of two knurled-head shoulder screws 41, 41, in threaded holes in annulus 40 taking through concentric sector slots, 42, 42, Figs. 4 and 5, in flange 17, and binding against the back face of said flange. Concentric with recess 19 and annulus 40 the front surface of flange 17 is graduated in circular measure or as shown, carries a scale 43, which as shown in Fig. 5 may be graduated in each direction from at least one quadrant point through a 45° arc. An index mark 39 on annulus 40 may be read against scale 43.

The target head is preferably provided in addition to one of the discs 27, with a concentrically rotatable object adapted to be moved to any angular position about the center of a disc 27. As shown in Figs. 1 and 2 flange 17 may support for rotation an internally shouldered ring 44 having an exterior seat for a glass or other transparent disc 46, held in place by annulus 47 suitably fastened to ring 44. Ring 44 may be turned and clamped by a binding screw 49 taking into groove 18.

The interior face of disc 46 is marked, preferably by pigment-filled engraving, to constitute an object, typically the diametrical line 50, in line with a similarly constructed index mark 51, which may have an accompanying vernier scale 52 reading against scale 43. These dispositions are such as to provide a target in which the mark or marks on the transparent rotatable element 46 may be inclined either to the target disc indications behind it or to a visually superposed image of another target in projected concentric relation to it and its target disc, through a measured arc; and such as to provide, in the case of two similar targets, for accurate vertical and rotative adjustment for exact optical superposition of the central axis and rotation about this axis of two object targets; and affording provision for fused vision of two targets by both eyes, severally looking at each, when the targets are actually or virtually within the fusional amplitude of an observer whose eyes are under examination. Additionally, each or either target has at least two component elements adapted to be rotated on the same axis independently to an accurately measurable extent. It will be understood that displacement of the disc 27 in respect to the zero of scale 43 may be measured accurately by alignment with the mark 50 on disc 46, displacements of which can be read by vernier 52; usually direct reading of mark 39 against scale 43 is sufficient.

The faces of the visual objects carried by the elements of the targets may be illuminated for vision by reflected light; for example, each base 1 may carry for universal adjustment one or more illuminators, here shown as two small projectors 54, 55, each having an incandescent lamp 56 and lens 57, mounted on lugs 58, 59, of base 1, for example by ball-and-pinch-socket linkages 60, 61 as shown, and having suitable circuit connections 62, 63. In some cases it is desirable to light only the central areas within the border of discs 27, and the projectors 54, 55 may each be arranged to provide this.

For certain measurements of disagreement between the eyes of dimensional perception of objects severally perceived, it is desirable to provide an object quantitatively variable in dimension without change of vergence, accommodation or distance. Usually, it is desirable to measure the quantity of the error of dimensional perception while fusion exists in respect to like elements of two targets independently viewed by each eye, the dimensional error occurring as a difference in the perceptive magnitude of one or both unlike elements of the targets severally and not visually fused. Referring to Figs. 6, 7 and 8, the ring 44 of Figs. 1 and 2 may be provided, instead of the glass disc 46, with a metal bridge 65 having an edge 66 on a chord of the ring 44 and having a hole for a shouldered screw 67 held by a flat nut 68, Fig. 8 and having a head bored and threaded transversely for a micrometer screw 69, held against longitudinal movement by shoulders taking against faces of a slotted bearing 70 mounted on the face of a slide 71 slotted at 72 for screw 67, which holds it against bridge 65, slide 71 also having a longitudinal shoulder fitting against edge 66. On one face of slide 71, a depending rectangular glass plate 73 is cemented to move with slide 71 parallel with chord 66 in relation to ring 44. An object line 74 like the line 50 of Fig. 1 may be engraved on plate 73 perpendicular to chord 66 and movable longitudinally thereof, whereby the line 74 may be placed eccentrically to the axis by a distance measured by a scale 71ᵃ on slide 71 read against a vernier 71ᵇ mounted on screw 67.

The corresponding object disc of the complementary targets of this device may comprise an annulus 40ᵃ like the annulus 40 above explained, but it is preferred to have the actual objects movable a measurable distance toward and from the center. For this annulus 40ᵃ may be provided with dovetail slots 40ᵇ for rack slides 75, 75 each having vernier scales 75ᵃ to read against a scale 75ᵇ on the face of ring 40ᵃ. Hand pinion shafts 41ᵃ corresponding to the screws 41 and extending through the slots 42 have bearings in holes in the annulus 40ᵃ, and by these the slides 75 may be independently adjusted radially.

The disc 27 may be slotted radially at 27ᵃ, 27ᵃ over the slides 75, which may be of the same color and value as the disc 27. Each slide carries object marks, shown as artificial star holes 30ᵃ. One of the complementary targets with the same slides 75 may, if desired, have on them at the same distances apart as the holes 30ᵃ broken lines 76, Fig. 6ᵃ. In use one target is not internally lit.

In order to provide objects for fused vision off the axis in respect to which there is no shift of position of the eye axes for determinations of discordant dimensional perception of one eye relative to the other, and referring now to Figs. 9, 10 and 13, one target may have a heterogeneous central object as 34ᵃ, and the other a central star 30, on the binocular combination of which objects, adjustments having been made for phorias as presently explained, the patient's attention is fixed. Preferably dimensional perception is to be related to the fused binocular perception of an object off the central axis, the inquiry by experiment being as to difference in angular magnitude of the distances from 30, 34ᵃ coaxially related to the several objects perceived as one by fusion when fixation is on the central axis. Each target may therefore have like elements of an object for fusion, said elements being movable radially of the central axis at 30, 34ᵃ.

The ring 44 may carry for these purposes a rectangular frame 80 upon which are erected bearing lugs 81, 81ᵃ for two micrometer screws 82, 82ᵃ, whose inner circumferentially grooved ends enter holes in a bearing lug 83 on frame 80 into which grooves stud-point screws 84 enter. The screws 82, 82ᵃ respectively engage internally threaded nuts 85, 85ᵃ on projections 86 erected from slides 87 having edges 88 bearing on an edge 80ᵃ of the frame 80 which defines a chord of the ring 44. The slides 87 have cemented thereto rectangular glass plates 90, 90ᵃ, each of which is provided with an object, preferably the same kind of object, such as the lines 35 and 36. The lower ends of the glass plates 90, 90ᵃ may be guided as shown behind one edge of the frame 80. The slides 87 each may carry an index 88 reading against one of the scales 91 on frame 80 to measure displacement from center of the objects on plates 90, 90ᵃ.

The devices of Fig. 6 and of Fig. 9 are rotatable with ring 44 about the center of the target as in the case of the device of Fig. 1.

Referring now to Fig. 3, and assuming the patient's eyes OS and OD to be placed so that their axes of rotation horizontally, vertically and by cyclotorsional motions are at $o$ and $o'$ respectively, the apparatus, (which may be that described and claimed in the said application of Adelbert Ames, Jr. Serial No. 272,027, filed April 23, 1928 except as herein specified) provides optically plane mirrors $m$, $m'$, respectively perpendicular to bisectors of the angles $o$ $m$ T and $o'$ $m'$ T', T and T' being targets as hereinabove described. Slide tracks 3, 3$a$, $a$, and 3ᵇ, $a'$ are respectively movable in a horizontal plane about centers in that plane as the ends of angular portions $a$ and $a'$ coincident with the projection on that plane of the points $o$, $o'$; the mirrors $m$ and $m'$ are fixed to the tracks, and T and T' can slide on the virtual optical axes by reflection in mirrors $m$, $m'$. Therefore, OD and OS being converged, parallel or diverged, vision of a fused binocular composite of T and T' is possible within the horizontal fusional amplitude of the patient, as if these targets occupied a position T², or to right or left of that position and were directly viewed. In some cases the mirrors $m$, $m'$ are half-silvered, and a target at T² may be employed in cooperation with a target at T or at T' or at both positions, screens $s^2$ or $s^3$ cutting off direct vision on occasion. Sliding diaphragm screens at $s$, $s'$ are provided to hide the outer portions of the targets. These diaphragms may have differing polygonal openings and be used in out-of-focus position, and are useful to exclude the outer portions of the targets from fused binocular vision.

Referring to Figs. 11, 12 or 13, complementary pairs of targets at T or T' may show objects of like character capable of being fused, as discs 27 having the concentric circles, 31, 31ᵃ respectively; and also having objects 30ᵃ, 30ᵇ (star holes) unlike similarly placed objects 31ᵇ, 31ᶜ (black dots on a white ground, for example) not capable of being visually fused. If the slide tracks 3ᵃ are placed at an angle (measurable in meter angles on scales $x$ and $y$, Fig. 3) to correspond to ocular convergence at distances $o$, T², $o'$ T² for normal binocular vision of an object at T² and the eyes are accommodated therefor, the central rings of Fig. 11 will appear as one object. But if the target face having the stars 30ᵃ 30ᵇ only is dark, and the lamp 24 is lit, the eyes are disassociated, and the star images will not coincide with the dots 31ᵇ, 31ᶜ, unless the patient's eye viewing the artificial stars is free from muscular imbalance (horizontal or vertical phoria). A central single star image will serve for this determination, and the target for the other eye may be at T². In either case the amount of angular adjustment of track 3ᵇ and of vertical adjustment by hand nut 15 of the internally lit target required to bring about coincidence measures and compensates for these phorias.

Conditions may be reversed for the same determination for the other eye.

There are many patients who are still unable, when axial coincidence of star image and unlike corresponding mark is secured, to bring corresponding star and mark into coincidence because one system appears to be rotated about the other. This will occur whether or not there is actual fusion at the center, as when the targets of Fig. 11 are both viewed by reflected light at a virtual vergence angle permitting fusion of the marks 31, 31ᵃ. Such persons have a cyclotorsional disturbance, and one or both of the discs 27 may be required to be rotated through an angle measuring the sign and degree of this disturbance to bring about angular coincidence of the star and dot objects.

In this connection, measurement of cyclofusional amplitudes is of diagnostic significance, and for this purpose two targets having linear objects like 32b, 32c on the disc 46 afford by readings of mutual or individual rotation of the discs 44 and report of limits of fusion or separation a valuable measurement. The apparatus described permits these and other measurements to be carried out at varying vergences and accommodations, which have significant relation to the comparative ocular function.

Also of diagnostic significance are phenomena which we have named "retinal slip". In the case of fused vision on the like objects of such targets as those of Fig. 11 or Fig. 12 (in which a diametrical line of star holes 30a corresponds to the gaps in similarly spaced vertical lines 34) it has been observed that when the eyes are associated by convergence on and fused vision of the like parts, that nevertheless there is perceptive displacement of the unlike parts (stars and line-gaps, for example) at certain vergences, or an actual phoria of perception accompanying association of the eyes in joint perception of like parts of the object as one object. This phenomenon appears and disappears on changes of accommodation at the same vergence or of vergence change at the same accommodation, and is apparently associated with the phorias measured under disassociation, and with the effort to accommodate. The target apparatus of Fig. 6 is particularly useful for measuring the relative perceptive error in this phenomenon, but the devices of Figs. 11 and 12 afford sufficient indication of disappearance, direction and magnitude of these phenomena by the report of the patient of what he sees.

There are patients who, when observing targets of the kinds herein mentioned under conditions correcting phorias and the retinal slip phenomena, if they should have such defects or, if no such defects can be found, are nevertheless unable to secure perspective correlation of the unlike kinds of objects, and in whose eyes the identically spaced objects on the targets do not activate identically spaced retinal perceptions or identical ocular images. Refractive ametropia being not present or eliminated, the phenomena demonstrate an asymmetry of retinal perception or ocular image difference. In the case of the objects of Fig. 11, for example, these persons may note that the star images on one arm or another or throughout their distribution are spaced differently from the corresponding dots. Targets of the kind of Fig. 12 can be used in different positions to investigate the quantity, sign and orientation of these peculiarities. Local correction, on one side or the other, for example, may be found by changes of the relative positions of lines of vision from the eyes to corresponding objects or corrective lenses similar to lenses described in copending application Serial No. 385,610 for use in spectacles to be worn like the conventional eyeglasses. Such correction may involve over-all size differences which are taken care of by placing a size increasing lens before one eye or a size decreasing lens before the other eye, or, in extreme cases, by placing lenses having opposite effects in front of eyes respectively. Meridional ocular image differences or retinal asymmetry on a certain meridian are rectified with cylindrical size changing lenses, and defects which involve both over-all and meridional size defects can be corrected by an appropriate lens combination. These corrective lenses are placed between the eyes and the mirrors $m$, $m'$ (Fig. 3) as indicated at $a$, $a'$, these lenses being supported in suitable holders which may be similar to those described in the above-mentioned copending application. Quantitative measurements of local displacement may be accurately made by use of the movable objects of the devices of Figs. 6 and 9. The procedure is to displace the slides of these devices to bring about local coincidence of the unlike objects, and measure the displacements on the scales of the apparatus.

In the kind of target device shown in Fig. 13 for which see the devices of Figs. 9 and 10, objects capable of being fused are provided at 35, 35a on the movable slides for variation of their distance severally from the axial star 30 and gap in line 34a. In the device of Fig. 6 motion of the fused object could be utilized to determine asymmetry, but this involves a shift of the direction of attention. In case of the device of Fig. 9, attention remains fixed on the star and gapped line device, and the fused figure is displaced to bring about coincidence and investigate the existence, direction and quantity of the retinal asymmetry. It will be understood that in both instances the measurement involves the production in the patient's eyes severally of harmonious and symmetrical vision of the fusion of monocular images whereas in fact the infusible images originate in objects which have been distorted through measured angular magnitudes to produce the effect of like and undistorted binocular perception.

The described apparatus affords by its described elements devices for the rapid, convenient and accurate measurement of many other ocular functions, structures and performances under variable conditions of vergence and accommodation as will be apparent to those skilled in optical diagnosis.

We claim:

1. Apparatus for the clinical determination of errors of joint ocular perception having therein in combination, apparatus permitting and inducing joint vision of two or more objects, one by each eye, and targets having thereon like objects for visual fusion and unlike objects for apparent projection on each other spacially arranged in reference to each other, whereby judgment can be made of the relative displacement of the dissimilar objects.

2. Apparatus for the clinical determination of errors of joint ocular perception having therein in combination, apparatus permitting and inducing joint vision of two or more objects, one by each eye, and targets having thereon like objects for visual fusion and unlike objects for apparent projection on each other, and means permitting one kind of object to be moved in relation to the other kind.

3. Apparatus for the clinical determination of errors of joint ocular perception having therein in combination with apparatus inducing joint vision of two or more objects, one by each eye, targets affording like objects for visual fusion and unlike objects for apparent projection on each other, means permitting one kind of object to be moved in relation to the other kind, and means for measuring deviations of the appearance of one kind of object from the other kind.

4. Apparatus for the clinical determination of errors of joint ocular perception having therein in combination, apparatus permitting and inducing joint vision of two or more objects, one by each eye, and targets having thereon mutually related spaced series of like objects for visual fusion and similarly spaced unlike objects for apparent projection on each other, and means permitting one kind of object to be moved in relation to the other kind.

5. Apparatus for the clinical determination of errors of joint ocular perception having therein in combination with apparatus inducing to joint vision of two or more objects, one by each eye, targets affording like objects for visual fusion and unlike objects for apparent projection on each other and means permitting horizontal, cyclo-angular, distance, and vertical adjustment of said targets severally.

6. Apparatus for the clinical determination of errors of joint ocular perception having therein in combination with apparatus for inducing joint vision of two or more objects, one by each eye, targets having thereon like objects for fusion and unlike objects respectively on each target in the same spacial relation, in combination with means for moving the objects of one kind about an axis common to the binocular appearance of both kinds of objects.

7. Apparatus for the clinical determination of errors of joint ocular perception having therein in combination with apparatus for causing joint vision of two or more objects, one by each eye, targets characterized by objects respectively alike for binocular fusion and unlike but spacially similar, the respective objects having elements severally rotatable about the virtual axes of the respective eyes in relation to each target.

8. Apparatus for the clinical determination of errors of joint ocular perception having therein in combination with apparatus for causing joint vision of two or more objects, one by each eye at variable vergences and variable virtual distances, targets characterized by objects respectively alike for binocular fusion and unlike but spacially similar, the respective objects being severally rotatable about the virtual axes of the respective eyes in relation to each target.

9. Apparatus for the clinical determination of errors of joint ocular perception having therein in combination with apparatus for causing joint vision of two or more objects, one by each eye, targets having provision for vertical adjustment of an axis of rotation, and severally comprising a transparent member carrying an object for motion in respect to said axis, and a member having object markings adapted to be rotated about said axis through substantial angles.

10. Apparatus for the clinical determination of errors of joint ocular perception having therein in combination with apparatus for causing joint vision of two or more objects, one by each eye, targets having provision for vertical adjustment of an axis of rotation, and severally comprising a transparent member carrying an object for motion in respect to said axis and a member having object markings adapted to be rotated about said axis through substantial angles, and means permitting horizontal angular adjustment of the position of said targets in respect to the axis of horizontal rotation of each eye.

11. In a target device for optical mensuration apparatus comprising a plurality of targets each comprising an object field displaying visual objects, in combination, standards bearing complementary visual objects, at least one of said targets comprising a lantern for the illumination of an artificial star hole in the object field of the target, and at least one of said targets comprising a sheet bearing a mark and means for turning said sheet through a measured angle about an axis perpendicular to said sheet and said object field.

12. In a target device for optical mensuration apparatus comprising a plurality of targets each comprising an object field displaying visual objects, in combination, standards bearing complementary visual objects, at least one of said targets comprising a lantern for the illumination of an artificial star hole in the object field of the target, said targets each comprising a sheet bearing a mark and means for turning said sheet through a measured angle about an axis perpendicular to said sheet and object field, and at least one target comprising means for adjusting an object upon it toward and away from said axis.

13. In a target device for optical mensuration apparatus comprising a plurality of targets, in combination, standards each bearing one of complementary visual objects, at least one of said targets comprising the object field displaying visual objects, a lantern for the illumination of an artificial star hole in the object field of the target, said targets each comprising a sheet bearing a mark and means for turning said sheet through a measured angle about an axis perpendicular to said sheet and said object field, and at least one target comprising means for adjusting, its object-field device having an artificial star hole in it toward and away from said axis.

14. In a target device for optical mensuration apparatus, the combination of a head having a flange and a recess, an annular holder for an object-sheet rotatable in said recess, a ring mounted for rotation on said flange, and a cooperating object mark carried by said ring for concentric rotation.

15. Target device for clinical optical mensuration apparatus having therein a scale for measuring rotation about a center, an annulus adapted to bear a disk object for rotation about said center, and a transparent sheet mounted for rotation about said center, said annulus and sheet having indices related to said scale; and means for illuminating a hole in said disk object.

16. Clinical optical apparatus having therein a target having object markings including an artificial star hole in the target, means for illuminating the hole, and a complementary object mounted for lateral motion in respect to said hole.

17. Clinical optical apparatus having therein a target having object markings including an artificial star hole in the target, means for illuminating the hole, and two objects mounted for lateral motion in respect to said hole and each other.

18. Apparatus for the clinical determination of errors of joint ocular perception having therein in combination with apparatus inducing joint vision of two or more objects, one by each eye, targets affording like objects for visual fusion and unlike objects for apparent projection on each other, means permitting horizontal, cyclo-angular, distance, and vertical adjustment of said targets severally, means permitting one kind of object to be moved in relation to a target and the projected appearance of objects of the other kind, and means for measuring deviations of the appearance of one kind of object from the other kind.

19. Apparatus for the clinical determination of errors of joint ocular perception having therein in combination with apparatus inducing to joint visual perception of images severally formed in each eye of a patient of two or more objects, targets having parts constituting like objects for visual fusion by binocular vision and unlike objects for apparent projection on each other by binocular vision, and means for mounting said targets for horizontal angular adjustment in relation to each other.

20. Apparatus for the clinical determination of errors of joint ocular perception having therein in combination with apparatus inducing to joint visual perception of images severally formed in each eye of a patient of two or more objects, targets having parts constituting like objects for visual fusion by binocular vision and unlike objects for apparent projection on each other by binocular vision, and means for mounting said targets to be moved severally along radii from the patient's eye for measurements of distance.

21. Apparatus for the clinical determination of errors of joint ocular perception having therein in combination with apparatus inducing to joint visual perception of images severally formed in each eye of a patient of two or more objects, targets having parts constituting like objects for visual fusion by binocular vision and unlike objects for apparent projection on each other by binocular vision, and means for mounting said targets for several adjustment vertically through known distances in relation to the plane of the binocular axes.

22. Apparatus for the clinical determination of errors of joint ocular perception having therein in combination with apparatus inducing to joint visual perception of images severally formed in each eye of a patient of two or more objects, targets having parts constituting like objects for visual fusion by binocular vision and unlike objects for apparent projection on each other by binocular vision, and means for mounting said targets for several adjustment rotatively about an axis normal to their faces for cyclo-angular mensuration.

23. Apparatus for the clinical determination of errors of joint ocular perception having therein in combination with apparatus inducing to joint visual perception of images severally formed in each eye of a patient of two or more objects, targets having parts constituting like objects for visual fusion by binocular vision and unlike objects for apparent projection on each other by binocular vision, and means for mounting said targets for several adjustment rotatively about an axis normal to their faces for cyclo-angular mensuration, said like and unlike objects of one of said targets being adapted for rotation in respect to each other about said axis.

24. Method of determining the existence, direction and extent of asymmetry of retinal perception in a human eye comprising supplying refractive correction of ametropias, and bringing about harmonious and symmetrical vision of a binocular fusion of monocular images of targets having non-fusible objects thereon by distortion of one of the objects during simultaneous several vision of the respective eyes, and measuring the angular magnitude of the distortion of the object for one eye in respect to the other eye required to obtain harmonious and symmetrical fused vision.

25. Apparatus for testing a pair of eyes comprising means for presenting to each eye the appearance of a fusion object, means for presenting to one eye the appearance of a test object of one character placed on one side of said fusion object, and means for presenting to the other eye the appearance of a test object of different character similarly placed in relation to said fusion object.

26. Apparatus according to claim 25, further characterized in that a plurality of test objects are placed symmetrically with respect to the fusion object.

27. Apparatus of the character referred to comprising fusion means for causing a pair of eyes to converge at a predetermined distance, means for presenting to one of said eyes the appearance of test objects of one character definitely placed with respect to said fusion means, and means for concomitantly presenting to the other of said eyes the appearance of test objects of a different character similarly placed with respect to said fusion means.

28. Apparatus for the testing of a pair of eyes comprising means for forming on the retina of each eye like images adapted for binocular fusion, and means similarly disposed relative to said first means for forming on the several retinas unlike images.

29. Apparatus according to claim 28 further comprising means for changing the apparent separation in one eye relative to the other of the image formed by said second means.

30. The method of testing the human eye for variance in the size impressions of the ocular images of the two eyes comprising the formation of retinal images which are in part like and in part unlike in the respective eyes, changing the relative positions of the like and unlike parts to cause the image in one eye to be similar in extent to that in the other eye, and measuring said change.

31. The method according to claim 30 further characterized in that the eyes are tested for meridional size variances by measuring the change necessary to make the radio of dimensions on two different meridians of the image in one eye similar to the corresponding ratio of the image in the other eye.

32. The method of testing the human eyes for differences in size impressions thereof, comprising placing a chart in the line of vision of each eye, each chart having a marking thereon fusible with the other and each chart having a marking thereon not fusible with the other, fusing the fusible markings with each other and measuring the apparent separation of the non-fusible markings to determine the variance in size of images.

33. The method of testing a pair of eyes which comprises presenting to said eyes like semblances of an object and to each eye the form of a test object unlike the form presented to the other eye but similarly located with respect to each semblance, causing the eyes to fuse said semblances, and evaluating ocular defects by observing the apparent location of said unlike forms in binocular vision determined by said fusion.

34. A device of the character described comprising visual objects having like objects thereon which may be fused and unlike objects thereon which cannot be fused, one visual object being positioned at a given distance from each eye, means for superposition of the ocular images of said visual objects with each other, means for displacing the objects until the unlike objects assume a definite relation with each other, and means to measure said displacement to obtain the extent of phorias present.

35. A device of the character described, comprising test means having fusible means thereon and non-fusible means thereon positioned at a given distance from each eye, means for displacing the image of the non-fusible means of one eye relative to the corresponding image of the other eye, to place the non-fusible images in predetermined relation with each other, and means for measuring the extent of said displacement.

36. Apparatus for testing binocular vision for difference of the ocular images of the two eyes, comprising test target means with elements indicating dimensional properties thereof for forming in the respective eyes images whose dimensions may be compared, means for relating the conscious appearances of the corresponding ocular images of said target means for comparison thereof in binocular vision, means for changing the relative size of said images by adjusting the position of said elements until they assume a predetermined location in superposed appearance, and means for determining the amount of said adjustment.

37. Apparatus for testing binocular vision for difference of the ocular images of the respective eyes, comprising a test object means before each eye inducing judgment of at least one dimension, means for relating conscious appearances of the ocular images of said test object means for comparison thereof, means for adjusting the relative dimensions of said test object means as perceived through the respective eyes, while substantially maintaining the distance of the respective images from the eyes, to obtain a dimensional relation of said ocular images, and means for measuring the amount of said adjustment.

38. The method of testing binocular vision for difference of the ocular images of the two eyes, comprising the formation in the respective eyes of images of test target means which have elements indicating dimensional properties of said target means, and whose relative positions may be compared, superposing the conscious appearances of the corresponding ocular images of said target means for comparison thereof in binocular vision, changing the relative size of said images by adjusting the position of said elements until they assume a predetermined location in superposed appearance, and determining the amount of said adjustment.

39. In the art of testing binocular vision the method of correlating the ocular images of a person which comprises presenting to each eye of the person a test object means with elements for dimensional comparison relating the conscious appearances of the ocular images of said test object means for comparison thereof, adjusting the relative dimensions of said test object means as appearing through the respective eyes while substantially maintaining the distance of the respective images from the eyes, to obtain a dimensional relation of said ocular images, and measuring said adjustment.

ADELBERT AMES, JR.
GORDON H. GLIDDON.